United States Patent [19]

Wong

[11] Patent Number: 4,674,009
[45] Date of Patent: Jun. 16, 1987

[54] TANTALUM CAPACITOR LEAD WIRE

[75] Inventor: James Wong, Wayland, Mass.

[73] Assignee: Supercon, Inc., Shrewsbury, Mass.

[21] Appl. No.: 851,343

[22] Filed: Apr. 14, 1986

Related U.S. Application Data

[63] Continuation-in-part of Ser. No. 812,140, Dec. 23, 1985.

[51] Int. Cl.⁴ .......................... H01G 9/00; H01G 7/00
[52] U.S. Cl. .................................... 361/433; 29/25.42
[58] Field of Search ............... 361/433; 419/4; 72/274

[56] References Cited

U.S. PATENT DOCUMENTS 3,708,728 1/1973 Sterling et al. ................. 361/433 A
4,364,163 12/1982 Schmidt ........................... 361/433 S Primary Examiner—Donald A. Griffin
Attorney, Agent, or Firm—Hayes, Davis & Soloway

[57] ABSTRACT

A tantalum lead wire for capacitors having improved grain growth characteristics is disclosed. The lead preferably comprises a Niobium core having a surface consisting of many discrete layers of tantalum surrounding the Niobium.

2 Claims, 4 Drawing Figures

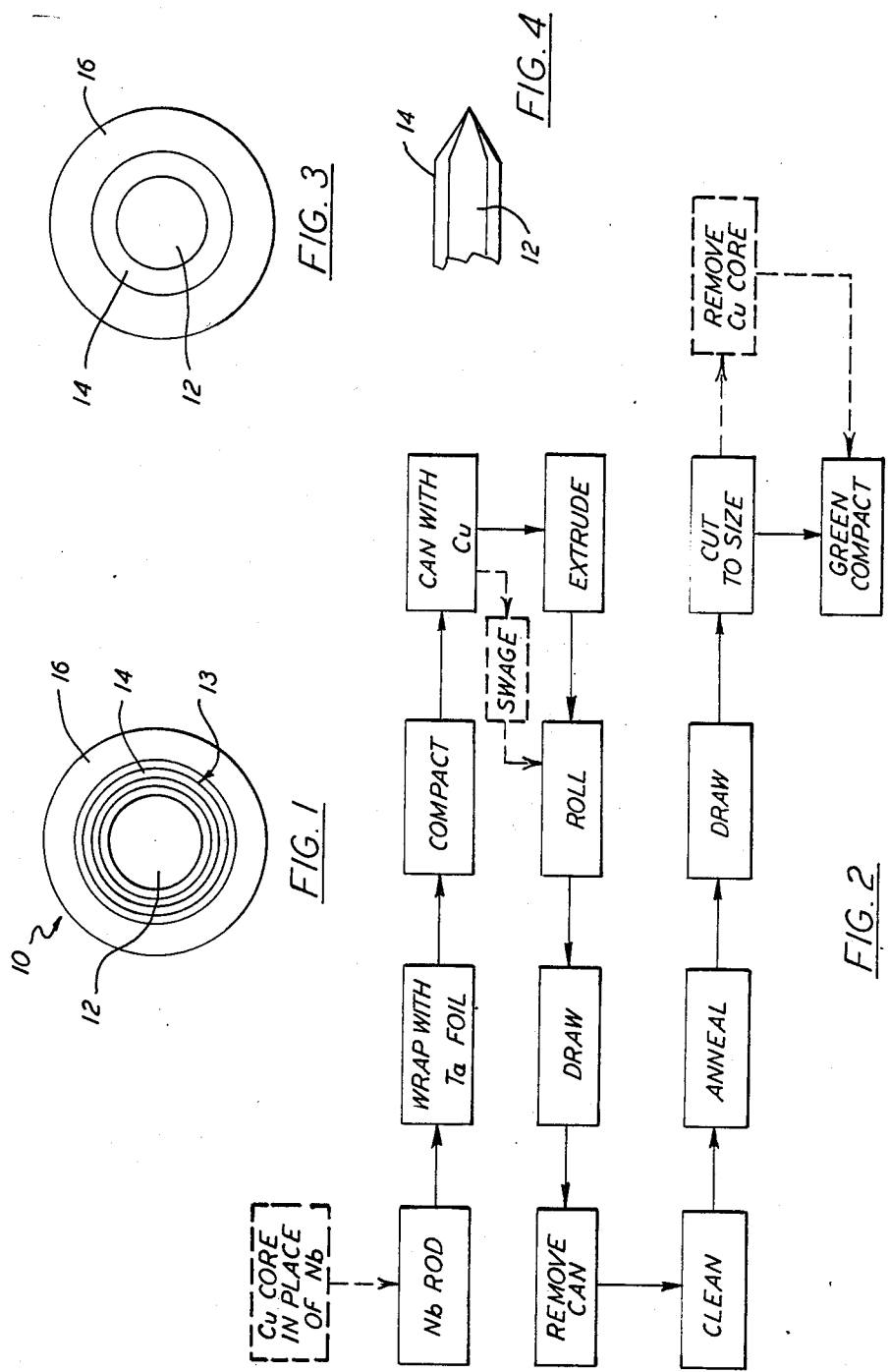

TANTALUM CAPACITOR LEAD WIRE

BACKGROUND OF THE INVENTION

This application is, in part, a continuation of my co-pending applicaion Ser. No. 812,140 filed Dec. 12, 1985.

The present invention relates to the tantalum capacitor art and more particularly to the production of tantalum wire for use as leads to tantalum powder capacitors. In the production of tantalum capacitors, tantalum powder is compressed to a pellet, the pellet including a tantalum lead wire, the resultant green pellet with the associated lead wire is then subjected to a sintering operation, normally under a vacuum, to create a metallurgical and electrical bond between the individual powder grains and to the lead wire. Thereafter, the resultant sintered body is anodized and impregnated with an electrolyte, preferably solid, and encapsulated to form the finished capacitor. It is essential that there be a good electrical and metallurgical bond between the tantalum lead wire and the capacitor pellet. It is also essential that the tantalum lead have sufficient mechanical strength and flexibility to withstand the rigors of further fabrication and attachment (which is often done on automatic machinery) to other circuit elements.

As circuit miniaturization has advanced, the need for smaller capacitors has also developed. Capacitor miniaturization has progressed to the point where many are of a diameter smaller than 2.5 mm and the capacitor leads are as small as 0.25 mm in diameter. This has been due to the improvement in obtaining higher capacitance per unit weight of tantalum powder. As capacitors become smaller, the percentage of value in the lead wire becomes larger so that with the smallest capacitors the lead wire is almost 50% of the capacitor value.

Another problem with capacitor miniaturization is that the necessary small diameter of the capacitor lead wire is such that at the elevated temperatures employed in the sintering operation, grain growth in the tantalum lead wire can be sufficiently great for the grain size to equal the tantalum wire diameter. This makes a very brittle wire. In the past this problem of grain growth has been addressed by various means to inhibit the grain growth in the wire. Such inhibitors are oxides, nitrides, and various alloying constituents. This has a disadvantage that these inhibitors are difficult to control and expensive to add and may also interfere with the metallurgical and electrical characteristics of the tantalum lead wire as well as perhaps contamination of the tantalum powder itself. Contamination introduced by the use of finer powder sizes which contain higher values of oxygen would also tend to further embrittle the lead wire.

SUMMARY OF THE INVENTION

The present invention is directed to overcoming the objections of the prior art by providing a tantalum capacitor lead which can be subjected to high temperature sintering without deleterious grain growth and at substantially lower cost. This objective is accomplished in a preferred form of the invention by providing a tantalum capacitor lead wire formed of a core and a surface layer of tantalum having a minimum thickness of 0.01 mm. This tantalum surface layer is preferably on top of several other tantalum layers; however, it may be a single tantalum layer carried by a refractory metal substrate, preferably Niobium where a plurality of tantalum layers are employed. The interface between each tantalum layer acts as a grain growth inhibiting boundary when the capacitor is sintered at an elevated temperature. In a preferred embodiment, when the wire has a diameter of 0.25 mm, the individual tantalum layers have a radial thickness of 0.01 mm or less. When such a wire is subjected to the high temperature of tantalum capacitor sintering, grain growth in the layer and between layers is severely limited. Some grain growth between layers would be expected when very high sintering temperatures are used, on the order of greater than 1800° C., but even this growth would be inhibited such that the extent of grain growth is substantially less than if a solid single Ta layer is used. It is also apparent that more layers and thinner layers would aid in producing a finer grain structure after sintering. Accordingly, such a wire can be subjected to 1950° C. for 30 minutes to provide appreciably less grain growth between layers.

Single crystal growth around the circumference of the layer will not occur, no matter how pure the tantalum may be. Grain growth will occur in the thickness dimension first and will then stop. Growth in the circumferential direction becomes increasingly more difficult because the axis of maximum growth depends on crystal orientation. Each grain tends to stabilize when one dimension equals 4 times any other dimension, i.e. crystal growth is encouraged to have minimum surface area. With prior art tantalum wires, unless grain stabilized, the grain growth can extend completely through the solid Ta wire to give a bamboo effect.

The product of the present invention is preferably formed by wrapping a tantalum foil around a metal billet to provide at least one layer of tantalum around the billet. In a preferred form of the invention, at least three tantalum layers are used and are compacted. The compacted body is inserted into an extrusion billet. The resultant composite is then extruded and the extruded composite is further reduced by rolling and/or drawing to a wire of the requisite small dimension for use as the final tantalum lead.

The core around which the tantalum sheet is initially wrapped may be niobium or Nb 1% Zr. If niobium, (or Nb 1% Zr) it remains in the center of the wire and is embodied in the final capacitor. Since niobium is cheaper and has approximately one-half the density of tantalum, the composite wire of a given size made according to the present invention, in addition to its other advantages, will be for the same volume significantly less expensive than one formed of solid tantalum. The core material can also be made of a Ta alloy such as Ta-Nb where the density of this alloy is substantially less than that of solid Ta. The actual alloy chosen would be determined on the specific electrical and mechanical properties desired for the lowest cost (less dense) application. If a Ta-Nb alloy is used for the core there should be at least 20% Nb present to compensate for the lower scrap value of the wire trimmings.

The total thickness, i.e., the number of layers and thickness of the Ta foil used, would be the minimum amount necessary to provide the required electrical and mechanical properties. During high temperature sintering, a certain amount of interdiffusion between niobium and tantalum will occur. A thicker tantalum layer (about 0.0254 mm) will show little or no niobium present at the surface of the lead wire (Table I). It is also possible to use a thin layer of high melting point material like molybdenum or tungsten as a diffusion barrier to further reduce this alloying tendency. Obviously, a solid molybdenum or tungsten core can also be used.

If copper is used as the core material, it can be removed to form a hollow wire which is then used as a capacitor lead and thus eliminate the alloying problem.

DETAILED DISCRIPTION OF THE INVENTION

In order to more fully comprehend the invention, reference should be had to the following detailed description taken in connection with the attached drawings wherein:

FIG. 1 is a schematic diagrammatic cross-sectional view of a preferred starting billet for making a wire of the present invention;

FIG. 2 is a flow sheet of the various process steps employed in one preferred embodiment of the invention.

FIG. 3 is a schematic diagrammatic cross-sectional view of a preferred starting billet for making a wire of the present invention according to another embodiment thereof;

FIG. 4 is a schematic diagrammatic sectional view of an end of a final capacitor wire made according to one peferred form of the invention.

Referring now to FIG. 1, the starting billet for making the tantalum wire is shown at 10 with a core 12 having a number of tantalum layers 14 surrounding the core. As can be seen, there are a number of interfaces 13 between the various layers, in the illustrated case, five layers being shown. An outer layer of Copper 16 is used for extrusion.

FIG. 2 should be considered in connection with the following example which shows one preferred method of practicing the invention.

EXAMPLE I

A niobium (99% Nb 1% Zr) rod 50 mm long and 38 mm diameter is cleaned in acetone and wrapped with 12 layers of tantalum foil derived from powder metallurgy stock, the foil being 0.15 mm thick. Such a powder derived foil is inherently more grain stabilized than electrom beam tantalum due to the relatively large amount of impurities resulting from the powder process. This composite is then assembled to produce a structure having a final diameter of 47 mm. The compacted tantalum foil niobium composite is then inserted into a copper billet having an interior diameter of 48 mm and an exterior diameter of 51 mm. This is sealed, heated to a temperature of 870° C. and then extruded under a pressure of 250 Tons at a rate of 65 inches/minute to an extrusion diameter of 12.8 mm. The resultant extrusion product is then further drawn through a number of drawing dies to a final diameter of 0.38 mm. The final product is then etched in acid to remove the outer layer of copper. Further drawing (after annealing) of the bare wire was done to obtain superior surface qualities. The wire is then cleaned, cut to appropriate capacitor lead length, and assembled into the capacitor compacts to make the "green" capacitor pellets to be vacuum sintered.

"Tantalum" and "niobium" includes alloys of tantalum and/or niobium suitable for use as capacitor leads.

The wire used in Example I was vacuum sintered at 1950° C. for 30 minutes and then subjected to scanning electron microscope examination of its surface to detect the presence of Nb which had diffused from the core to the wire surface. This test was done at a number of wire thicknesses, using the same ratio of Ta surface layer to core since all samples were drawn from the same starting material.

TABLE I

| Diameter inches | Ta thickness (mm) | % Nb (Atomic) |
| --- | --- | --- |
| .040" | .0406 | 0 |
| .025" | .0254 | 0 |
| .020" | .0191 | 0 |
| .015" | .0145 | 3–5% |
| .0113" | .0111 | 25–30% |

The same wire samples were then subjected to a standard bend test where each wire was bent 90°, straightened and rebent 90° in a plane removed 120° from the first bend (Table II).

TABLE II

| Diameter | Results |
| --- | --- |
| .040" | Not satisfactory |
| .025" | passed |
| .020" | passed |
| .015" | passed |
| .0115" | passed |

It is believed that the failure of the 0.040" wire was due to the larger diameter which, on bending, generates high surface strain due to its distance from the neutral axis of the wire.

While one preferred embodiment of the invention has been described above, numerous modifications may be made without departing from the spirit of the invention. For example, the Nb core can be replaced by a copper core which is leached out of the wire after the leads have been cut to length and before the leads are inserted in the green compact. (see dotted line steps in FIG. 2) This creates a hollow tube of Tantalum having a surface comprising many layers of Ta which inhibit grain growth. Similarly the Nb core can have a Cu center.

Other core materials can be used so long as adequate provisions are made, such as the use of diffusion barriers, to prevent undesirable constituents of the core from diffusing to the surface of the Ta wire.

Where absolute prevention of diffusion of the Nb to the surface is to be prevented, a layer of tungsten or molybdenum may be provided between the tantalum and niobium.

In another embodiment of the invention which, is particularly useful for manufacturing a product with minimum cost rather than optimum performance as the the principal criteria to be considered, a single layer of tantalum is provided on a refractory metal base, such as niobium. An example of this embodiment of the invention is shown in Example II set forth below.

EXAMPLE II

The following components are assembled: copper tube 15.9 mm O.D. with 12.7 mm I.D.; tantalum tube 12.7 mm O.D. with 0.5 mm wall; niobium solid rod 11.4 mm diameter. These components were cleaned and etched with appropriate acid, assembled and swaged to 7 mm O.D. This composite assembly is shown in FIG. 3. The composite was then drawn to 0.5 mm O.D. and the copper was removed by etching. This gave a final product having a tantalum outer layer thickness of about 0.015 mm with a final total wire diameter of 0.4 mm, this being the same diameter as in the product made by initial extrusion in Example I.

It appears that, while the extrusion step and the multi-layer wrapping are desirable when maximum performance is necessary, these are not necessary to provide an inexpensive product which is satisfactory for many uses.

In Example II, pure tantalum was used rather than tantalum sheet formed by powder metallurgy techniques. Accordingly, there was grain growth through the outer layer of tantalum during subsequent heating to 1800° C. However, grain growth did not extend completely around the circumference of the tantalum, since, as pointed out above, after any dimension of the crystal becomes greater than four times any other dimension of the crystal, further grain growth is inhibited. It should also be noted that the final tantalum layer is thick enough to prevent diffusion of the niobium to the surface of the tantalum wire, even when sintering temperatures on the order of 1950° C. are employed with times of 30 minutes.

In the specific embodiment of Example II, a drawn tube was utilized. A seam welded tantalum tube (which is inherently less expensive) may be equally used.

It is also possible to use one or more layers of tantalum sheet or foils wrapped around a niobium core or to use several concentric tubes of tantalum. In both of these cases, grain growth between layers would be limited.

While swaging has been mentioned as a first step in Example II, it can be used for taking the product down to even finer diameter than in Example II, or it can be for lesser reduction. The principal objective of the swaging is to permit subsequent further reduction of the wire as a unitary product, although it is not necessary that a complete metallurgical bond be obtained between the copper, tantalum and niobium.

As mentioned in connection with various modifications of Example I, diffusion barriers can be employed in the system of Example II and the tantalum and the niobium can comprise various alloys.

An important characteristic of both Examples I and II is that the final capacitor lead have a uniform tantalum surface with a radial thickness less than 0.3 mm. In Example II, the final tantalum thickness is 0.015 mm.

When the capacitor lead wires are finally cut, it is preferred that the tantalum outer surface be pinched and closed on itself, thus exposing a minimum amount of the core material. This cutting operation embodies the use of rounded cutting surfaces and, in effect, draws the tantalum coating down onto itself and thus over the niobium core so that little if any niobium is exposed in the final capacitor lead for interfering with the anodized tantalulm dielectric surface. An example of this type of preferred lead end is shown in exaggerated cross-section in FIG. 4. The wire should be in the annealed or stress relieved condition for the best results.

In either Example I or Example II, the core can be made of alternate wrapped layers of niobium and tantalum sheets or foils. After sintering, the grain size of the core would be fine grained due to the limited diffusion of the niobium into the tantalum layers and should result in greater ductility in the wire after sintering.

What is claimed is:

1. A flexible elongated metallic structure suitable for providing a lead to a capacitor anode formed of sintered tantalum powder, said flexible structure comprising a tantalum wire having a cross-section less than 1 mm, said wire comprising a core of a metal other than tantalum and at least one discrete surface layer of tantalum surrounding said core, the tantalum layer having a radial thickness less than 0.3 mm, said core comprising mixed alternate layers of tantalum and niobium.

2. A flexible elongated metallic structure suitable for providing a lead to a capacitor anode formed of sintered tantalum powder, said flexible structure comprising a tantalum wire having a cross-section less than 1 mm, said wire comprising a core of a metal other than tantalum and at least one discrete surface layer of tantalum surrounding said core, the tantalum layer having a radial thickness less than 0.3 mm, said lead being at least partially flattened, said lead having a flattened crimped end and the tantalum covers essentially all of the cut end.

* * * * *